United States Patent
Miyazawa (10) Patent No.: US 10,120,173 B2
(45) Date of Patent: Nov. 6, 2018

(54) ZOOM LENS AND IMAGE PICKUP APPARATUS INCLUDING THE SAME

(71) Applicant: CANON KABUSHIKI KAISHA, Tokyo (JP)

(72) Inventor: Nobuyuki Miyazawa, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/650,125

(22) Filed: Jul. 14, 2017

(65) Prior Publication Data

US 2018/0045931 A1 Feb. 15, 2018

(30) Foreign Application Priority Data

Aug. 9, 2016 (JP) .................. 2016-156316

(51) Int. Cl.
| | | |
|---|---|---|
| *G02B 15/14* | (2006.01) | |
| *G02B 15/28* | (2006.01) | |
| *G02B 15/24* | (2006.01) | |
| *G02B 15/10* | (2006.01) | |

(52) U.S. Cl.
CPC ............. *G02B 15/28* (2013.01); *G02B 15/10* (2013.01); *G02B 15/24* (2013.01)

(58) Field of Classification Search
CPC ......... G02B 15/28; G02B 15/10; G02B 15/24
See application file for complete search history.

(56) References Cited

U.S. PATENT DOCUMENTS

| 8,149,515 B2 * | 4/2012 | Wada ................ G02B 15/173 359/683 |
| 9,726,866 B2 | 8/2017 | Miyazawa |
| 2010/0328783 A1 | 12/2010 | Wada |
| 2016/0054579 A1 | 2/2016 | Miyazawa |
| 2016/0154226 A1 | 6/2016 | Miyazawa |
| 2017/0108678 A1 | 4/2017 | Miyazawa et al. |
| 2017/0269374 A1 | 9/2017 | Takemoto et al. |

FOREIGN PATENT DOCUMENTS

| JP | S61-296321 A | 12/1986 |
| JP | 2011-13281 A | 1/2011 |
| JP | 2012-088603 A | 5/2012 |
| JP | 2012-242617 A | 12/2012 |
| JP | 2015-28556 A | 2/2015 |

* cited by examiner

*Primary Examiner* — Joseph P Martinez
(74) *Attorney, Agent, or Firm* — Carter, DeLuca, Farrell & Schmidt, LLP

(57) ABSTRACT

Provided is a zoom lens, including, in order from object side: a positive first unit; a negative second unit; a third unit having a positive or positive refractive power; and a rear group including at least one unit, in which: the first unit is not moved for zooming, and intervals between adjacent units are changed during zooming; the first unit includes three lenses, and the second unit includes three lenses; at least two lens surfaces, among lens surfaces of lenses included in the second unit except for a lens arranged closest to the object side, have aspherical shapes; and focal lengths of the zoom lens at a wide angle end and at a telephoto end, movement amounts of the second and third units during zooming from the wide angle end to the telephoto end are appropriately set.

7 Claims, 9 Drawing Sheets

ZOOM LENS AND IMAGE PICKUP APPARATUS INCLUDING THE SAME

BACKGROUND OF THE INVENTION

Field of the Invention

The present invention relates to a zoom lens and an image pickup apparatus including the same, and is suitable for a photographing system, for example, a digital camera, a video camera, or a television (TV) camera.

Description of the Related Art

In recent years, a monitor has an increasingly high definition, and a zoom lens mounted on a digital camera, a video camera, or a TV camera is also required to have high image quality. Under such circumstances, a solid-state image pickup element is required to be increased in size so as not to reduce its sensitivity even when the number of pixels is increased, but at the same time, the zoom lens is required to be further reduced in size in order to suppress an increase in size of the entire camera.

In the related art, there is known, as a zoom lens that is small and is capable of efficiently securing a magnification-varying ratio, a zoom lens including, in order from an object side to an image side, lens units having positive and negative refractive powers, in which a lens unit arranged on the image side of a third lens unit is configured to correct a movement of an image plane accompanying zooming.

For example, in Japanese Patent Application Laid-Open No. 2012-88603, there is disclosed a zoom lens including, in order from an object side, lens units having positive, negative, positive, and positive refractive powers, in which a first lens unit is configured not to move for zooming, and which has a zoom ratio of about 10 to about 14. In Japanese Patent Application Laid-Open No. 2012-242617, there is disclosed a zoom lens including, in order from an object side, lens units having positive, negative, positive, negative, and positive refractive powers, in which a first lens unit and a fifth lens unit are configured not to move for zooming, and which has a zoom ratio of about 10.

In Japanese Patent Application Laid-Open No. 2012-88603, a second lens unit and a third lens unit are moved. However, a movement amount of the third lens unit is small, and there has been a problem in suppressing variations in various aberrations during zooming.

In Japanese Patent Application Laid-Open No. 2012-242617, an F-number at a telephoto end is dark at about F7, and when a magnification and an aperture are further increased, it becomes difficult to correct spherical aberration and coma at the telephoto end.

SUMMARY OF THE INVENTION

In view of the above, it is an object of the present invention to provide a zoom lens having a small minimum F-number (bright) and good optical performance with a wide angle and a high magnification while suppressing a size of the entire optical system, and an image pickup apparatus including the zoom lens.

In order to achieve the above-mentioned object, according to one embodiment of the present invention, there is provided a zoom lens, including, in order from an object side to an image side: a first lens unit having a positive refractive power; a second lens unit having a negative refractive power; a third lens unit having one of a positive refractive power and a negative refractive power; and a rear lens group including at least one lens unit, in which: the first lens unit is not moved for zooming, and intervals between adjacent lens units are changed during zooming; the first lens unit includes at least three lenses, and the second lens unit includes at least three lenses; at least two lens surfaces, among lens surfaces of lenses included in the second lens unit except for a lens arranged closest to the object side, have aspherical shapes; and the following conditional expressions are satisfied:

$$0.38 < |m3/m2|; \text{ and}$$

$$9.00 < ft/fw,$$

where fw represents a focal length of the zoom lens at a wide angle end, ft represents a focal length of the zoom lens at a telephoto end, m2 represents a movement amount of the second lens unit during zooming from the wide angle end to the telephoto end, and m3 represents a movement amount of the third lens unit during zooming from the wide angle end to the telephoto end, in which a movement amount has a positive sign when a lens unit is located on the image side at the telephoto end as compared to the wide angle end.

According to the present invention, it is possible to provide the zoom lens having a small minimum F-number (bright) and good optical performance with a wide angle and a high magnification while suppressing the size of the entire optical system, and the image pickup apparatus including the zoom lens.

Further features of the present invention will become apparent from the following description of exemplary embodiments with reference to the attached drawings.

DESCRIPTION OF THE EMBODIMENTS

Now, a zoom lens according to the present invention is described in detail with reference to the accompanying drawings.

The zoom lens according to the present invention includes, in order from an object side to an image side, a first lens unit having a positive refractive power, a second lens unit having a negative refractive power, a third lens unit having a positive or negative refractive power, and a rear lens group including one or more lens units, and has the structure suitable for high magnification zooming. Moreover, the first lens unit is configured not to move for zooming, and an interval between a pair of adjacent lens units is changed for zooming, to thereby allow the third and subsequent lens units to have a magnification varying action and correct a variation of an image plane during zooming.

The first lens unit includes three or more lenses, and is configured to mainly correct spherical aberration and axial chromatic aberration on a telephoto side. The second lens unit includes three or more lenses, and is configured to suppress variations in field curvature and lateral chromatic aberration during zooming. The second and subsequent lenses from the object side of the second lens unit have two or more aspherical surfaces. In other words, of lens surfaces of lenses included in the second lens unit except for a lens arranged closest to the object side, two or more lens surfaces have aspherical shapes. With this structure, a variation in coma from an intermediate focal length to a telephoto end is corrected.

In addition, the following conditional expressions are satisfied:

$$0.38 < |m3/m2| \quad (1); \text{ and}$$

$$9.00 < ft/fw \quad (2).$$

In the conditional expressions (1) and (2), ft represents a focal length of the zoom lens at the telephoto end, fw represents a focal length of the zoom lens at a wide angle end, m2 represents a movement amount of the second lens unit during zooming from the wide angle end to the telephoto end, m3 represents a movement amount of the third lens unit during zooming from the wide angle end to the telephoto end, and m2 and m3 have positive signs when the lens units are located on the image side at the telephoto end as compared to the wide angle end.

The conditional expression (1) is an expression that defines, in an absolute value, a ratio between the movement amounts of the second lens unit and the third lens unit from the wide angle end to the telephoto end. When the conditional expression (1) is not satisfied, the movement amount of the third lens unit is small, and the refractive power of the third lens unit becomes stronger to obtain a desired magnification-varying ratio, with the result that it becomes difficult to correct a variation in field curvature during zooming and the spherical aberration at the telephoto end.

The conditional expression (2) is an expression that defines a magnification-varying ratio. When the conditional expression (2) is not satisfied, more units are required to obtain effects similar to those obtained by the present invention, which is not preferred for a scope to which the present invention is applied.

With the above-mentioned configuration, the object of the present invention is achieved, but it is desired to satisfy the following conditional expression in the present invention:

$$0.40 < |m3/f3| < 0.65 \quad (3).$$

In the conditional expression (3), f3 represents a focal length of the third lens unit.

The conditional expression (3) is an expression that defines, in an absolute value, a ratio of the movement amount of the third lens unit from the wide angle end to the telephoto end to the focal length of the third lens unit. When the upper limit condition of the conditional expression (3) is not satisfied, it becomes necessary to move, by a large amount, the third lens unit having a strong refractive power, with the result that it becomes difficult to suppress the variations in field curvature and coma during zooming. In contrast, when the lower limit condition of the conditional expression (3) is not satisfied, a contribution of the third lens unit to zooming becomes smaller, with the result that it becomes disadvantageously difficult to attain a high magnification-varying ratio.

Further, it is desired to satisfy the following conditional expression in the present invention:

$$0.1 < m2/ft < 0.3 \quad (4).$$

The conditional expression (4) is an expression that defines the movement amount of the second lens unit from the wide angle end to the telephoto end, and the focal length of the zoom lens at the telephoto end. When the upper limit condition of the conditional expression (4) is not satisfied, a total length of the zoom lens is disadvantageously increased. In contrast, when the lower limit condition of the conditional expression (4) is not satisfied, the refractive power of the second lens unit, which is required to obtain the desired magnification-varying ratio, becomes stronger, with the result that it becomes difficult to correct the variation in field curvature during zooming and the spherical aberration at the telephoto end.

Further, it is desired to satisfy the following conditional expression in the present invention:

$$1.3 < m2/D1 < 3.0 \quad (5).$$

In the conditional expression (5), D1 represents a thickness of the first lens unit on an optical axis.

The conditional expression (5) is an expression that defines a ratio of the movement amount of the second lens unit from the wide angle end to the telephoto end to the thickness of the first lens unit on the optical axis. When the upper limit condition of the conditional expression (5) is not satisfied, the movement amount of the second lens unit is large, and hence an entrance pupil at the intermediate focal length becomes longer, with the result that a front lens diameter is disadvantageously increased. In contrast, when the lower limit condition of the conditional expression (5) is not satisfied, the refractive power of the second lens unit, which is required to obtain the desired magnification-varying ratio, becomes stronger, with the result that it becomes difficult to correct the variation in field curvature during zooming and the spherical aberration at the telephoto end. Alternatively, the number of constituent lenses of the first lens unit may be increased to correct the spherical aberration and the coma at the telephoto end as with the effects of the present invention, contrarily to the spirit of the invention.

Moreover, in the present invention, it is desired that the third lens unit include at least one negative lens.

It is apparent that when the third lens unit is a lens unit having a negative refractive power, the third lens unit includes at least one negative lens. When the third lens unit is a lens unit having a positive refractive power, it is preferred that the third lens unit include at least one negative lens to suppress a variation in axial chromatic aberration during zooming.

Moreover, in the present invention, it is desired that the zoom lens include an aperture stop on the image side of a lens arranged fourth when counted from a lens arranged adjacent to the first lens unit on the image side.

It is desired that lenses arranged on the object side of the aperture stop include at least four lenses in addition to the first lens unit to suppress the variations in field curvature and lateral chromatic aberration during zooming.

It is more desired to specify the numerical ranges of the conditional expressions (1) to (5) as follows:

$$0.38<|m3/m2|<1.00 \quad (1a);$$

$$9.40<ft/fw<30.00 \quad (2a);$$

$$0.43<|m3/f3|<0.62 \quad (3a);$$

$$0.16<m2/ft<0.28 \quad (4a); \text{ and}$$

$$1.4<m2/D1<2.7 \quad (5a).$$

Now, exemplary embodiments of the present invention are described in detail based on the accompanying drawings.

FIGS. 1, 5, 9, and 13 are lens cross-sectional views of zoom lenses according to Embodiments 1 to 4 (Numerical Embodiments 1 to 4 to be described later) of the present invention, respectively, and FIGS. 2 to 4, 6 to 8, 10 to 12, and 14 to 16 are aberration diagrams of the zoom lenses according to Numerical Embodiments 1 to 4, respectively. Of FIGS. 2 to 4, 6 to 8, 10 to 12, and 14 to 16, FIGS. 2, 6, 10, and 14 are aberration diagrams of the zoom lenses at the wide angle end, FIGS. 3, 7, 11, and 15 are aberration diagrams of the zoom lenses at the intermediate focal length, and FIGS. 4, 8, 12, and 16 are aberration diagrams of the zoom lenses at the telephoto end. In the aberration diagrams, a d-line and a g-line are represented by d and g, respectively, a meridional image plane and a sagittal image plane are represented by M and S, respectively, and the lateral chromatic aberration is expressed with the g-line.

FIGS. 1, 5, 9, and 13 are lens cross-sectional views for illustrating a first lens unit L1, a second lens unit L2, a third lens unit L3, a fourth lens unit L4, a fifth lens unit L5, an aperture stop SP, a glass block P such as a face plate or a low-pass filter of a CCD, and an image plane I. In this embodiment, the lens units are moved as indicated by the arrows in FIGS. 1, 5, 9, and 13 for zooming from the wide angle end to the telephoto end. The solid line and dotted line arrows indicate movement loci for correcting the variation of the image plane accompanying zooming when the focus is on an object at infinity and an object at a close distance, respectively.

Numerical Embodiments of the present invention are shown below.

In each of Numerical Embodiments, "Ri" represents a radius of curvature of an i-th surface from the object side to the image side, "Di" represents an interval between the i-th surface and an (i+1)-th surface (lens thickness or air interval), and "Ni" and "vi" represent a refractive index and an Abbe number of the material of the i-th lens, respectively. When refractive indices for the Fraunhofer d-line (587.6 nm), F-line (486.1 nm), and C-line (656.3 nm) are represented by Nd, NF, and NC, respectively, an Abbe number $v$ is expressed as follows:

$$v=(Nd-1)/(NF-NC).$$

The aspherical shape is expressed in the following expression, provided that an X axis corresponds to the optical axis, an h axis corresponds to an axis perpendicular to the optical axis, a traveling direction of light corresponds to a positive direction, represents a paraxial curvature radius, and respective aspherical coefficients are represented by "k", "A3", "A4", "A5", "A6", "A7", "A8", "A9", "A10", and "A11".

$$X = \frac{(1/R)h^2}{1+\sqrt{1-(1+k)(h/R)^2}} + A4h^4 + A6h^6 +$$

$$A8h^8 + A10h^{10} + A3h^3 + A5h^5 + A7h^7 + A9h^9 + A11h^{11}$$

Further, for example, "e-Z" means "×10$^{-z}$".

A half angle of view is a value determined by ray tracing. A back focus is represented by BF.

Numerical Embodiment 1

| Unit mm | | | | |
|---|---|---|---|---|
| Surface data | | | | |
| Surface number i | ri | di | ndi | vdi |
| 1 | 205.771 | 2.43 | 1.88202 | 37.2 |
| 2 | 76.326 | 8.50 | 1.49700 | 81.5 |
| 3 | −554.860 | 0.17 | | |
| 4 | 83.963 | 4.95 | 1.49700 | 81.5 |
| 5 | 471.683 | 0.17 | | |
| 6 | 60.944 | 6.40 | 1.49700 | 81.5 |
| 7 | 338.896 | (Variable) | | |
| 8 | 779.821 | 1.29 | 1.81600 | 46.6 |
| 9 | 20.025 | 6.00 | | |
| 10 | −409.205 | 1.01 | 1.75520 | 27.5 |
| 11 | 51.248 | 4.19 | | |
| 12* | −44.288 | 1.38 | 1.76182 | 26.5 |
| 13* | 303.515 | 2.19 | | |
| 14* | 80.056 | 3.72 | 1.95906 | 17.5 |
| 15* | −81.660 | (Variable) | | |
| 16 (Stop) | ∞ | (Variable) | | |
| 17* | 22.030 | 2.71 | 1.71300 | 53.9 |
| 18 | 89.912 | 12.28 | | |
| 19 | 995.895 | 0.68 | 1.80100 | 35.0 |
| 20 | 19.475 | 2.23 | | |
| 21* | 30.346 | 3.80 | 1.43875 | 94.9 |
| 22 | −44.887 | (Variable) | | |
| 23 | 36.031 | 6.83 | 1.55332 | 71.7 |
| 24 | −31.566 | 0.95 | 1.80000 | 29.8 |
| 25 | −60.832 | (Variable) | | |
| 26 | ∞ | 5.41 | 1.51633 | 64.1 |
| 27 | ∞ | 1.00 | | |
| Image plane | ∞ | | | |
| Aspherical surface data | | | | |
| Twelfth surface | | | | |

K = 5.23415e+000    A4 = −3.11189e−007    A6 = 1.59319e−009
A8 = 2.96297e−011

Thirteenth surface

K = 2.18962e+002    A4 = −8.66971e−006    A6 = −3.38267e−008
A8 = 1.92247e−011

-continued

Unit mm

Fourteenth surface

K = 1.62820e+001   A4 = −1.32117e−006   A6 = −9.87946e−009
A8 = −2.47899e−012

Fifteenth surface

K = −1.70303e+000   A4 = 1.62089e−006   A6 = 1.49766e−008
A8 = −5.46582e−012

Seventeenth surface

K = −2.51602e−001   A4 = −2.46794e−006   A6 = 8.49427e−010
A8 = −5.03456e−012

Twenty-first surface

K = 1.49921e−001   A4 = 3.83415e−007   A6 = 1.35245e−008
A8 = 8.58053e−011

Various data
Zoom ratio 19.50

|  | Wide angle | Intermediate | Telephoto |
|---|---|---|---|
| Focal length | 10.60 | 72.07 | 206.68 |
| F-number | 3.61 | 3.61 | 3.61 |
| Half angle of view | 36.10 | 5.85 | 2.03 |
| Image height | 7.41 | 7.41 | 7.41 |
| Total lens length | 198.01 | 198.01 | 198.01 |
| BF | 30.92 | 37.81 | 16.95 |
| d7 | 1.07 | 44.12 | 54.88 |
| d15 | 58.30 | 15.25 | 4.48 |
| d16 | 33.67 | 9.17 | 1.40 |
| d22 | 2.17 | 19.78 | 48.41 |
| d25 | 26.35 | 33.24 | 12.38 |

Zoom lens unit data

| Unit | First surface | Focal length |
|---|---|---|
| 1 | 1 | 85.73 |
| 2 | 8 | −21.38 |
| 3 | 17 | 69.13 |
| 4 | 23 | 49.32 |

Numerical Embodiment 2

Unit mm

Surface data

| Surface number i | ri | di | ndi | vdi |
|---|---|---|---|---|
| 1 | 178.057 | 1.96 | 1.83400 | 37.2 |
| 2 | 60.001 | 7.86 | 1.43875 | 94.9 |
| 3 | −272.136 | 0.17 | | |
| 4 | 57.855 | 5.83 | 1.49700 | 81.5 |
| 5 | −3611.688 | 0.17 | | |
| 6 | 57.398 | 3.43 | 1.53775 | 74.7 |
| 7 | 141.092 | (Variable) | | |
| 8 | −2080.933 | 0.81 | 1.88300 | 40.8 |
| 9 | 13.493 | 5.50 | | |
| 10* | −23.944 | 0.67 | 1.78800 | 47.4 |
| 11* | 57.657 | 0.17 | | |
| 12 | 43.172 | 2.83 | 1.92286 | 18.9 |
| 13 | −45.354 | (Variable) | | |
| 14 | −28.939 | 0.60 | 1.78800 | 47.4 |
| 15 | −56.254 | (Variable) | | |
| 16 (Stop) | ∞ | (Variable) | | |
| 17* | 13.007 | 3.00 | 1.58313 | 59.4 |
| 18* | −257.031 | 2.89 | | |
| 19 | 35.108 | 0.60 | 1.91082 | 35.3 |
| 20 | 12.563 | 0.46 | | |
| 21 | 16.699 | 2.44 | 1.49700 | 81.5 |
| 22 | −62.916 | 0.17 | | |
| 23 | 19.387 | 0.60 | 1.88300 | 40.8 |
| 24 | 13.631 | 2.78 | 1.43875 | 94.9 |
| 25 | −45.218 | (Variable) | | |
| 26 | 158.534 | 1.33 | 2.00069 | 25.5 |
| 27 | −20.449 | 0.60 | 1.88300 | 40.8 |
| 28 | 13.888 | (Variable) | | |
| 29 | −49.729 | 2.35 | 1.53775 | 74.7 |
| 30 | −12.812 | 0.60 | 1.95375 | 32.3 |
| 31 | −42.155 | 0.58 | | |
| 32 | 43.037 | 2.61 | 1.63980 | 34.5 |
| 33 | −29.595 | (Variable) | | |
| 34 | ∞ | 2.00 | 1.51633 | 64.1 |
| 35 | ∞ | 1.00 | | |
| Image plane | ∞ | | | |

Aspherical surface data

Tenth surface

K = −1.12535e+000   A4 = −2.56278e−005   A6 = 5.48500e−008
A8 = −4.27510e−010

Eleventh surface

K = −6.36388e+000   A4 = −2.46799e−005   A6 = 1.11088e−007
A8 = −2.45457e−010

Seventeenth surface

K = −2.48049e−001   A4 = −1.31894e−005   A6 = 2.64986e−009
A8 = 8.62890e−010

Eighteenth surface

K = −8.54422e+002   A4 = 2.95116e−005   A6 = 1.13204e−008
A8 = 4.58515e−010

Various data
Zoom ratio 19.50

|  | Wide angle | Intermediate | Telephoto |
|---|---|---|---|
| Focal length | 11.39 | 61.47 | 222.04 |
| F-number | 4.12 | 4.63 | 4.84 |
| Half angle of view | 35.60 | 6.65 | 1.86 |
| Image height | 7.41 | 7.41 | 7.41 |
| Total lens length | 139.25 | 139.25 | 139.25 |
| BF | 14.35 | 14.07 | 13.37 |
| d7 | 1.25 | 35.33 | 49.94 |
| d13 | 6.09 | 5.37 | 1.23 |
| d15 | 45.09 | 11.72 | 1.26 |
| d16 | 1.24 | 1.24 | 1.24 |
| d25 | 2.06 | 9.89 | 4.41 |
| d28 | 18.16 | 10.61 | 16.79 |
| d33 | 12.03 | 11.75 | 11.06 |

Zoom lens unit data

| Unit | First surface | Focal length |
|---|---|---|
| 1 | 1 | 71.09 |
| 2 | 8 | −14.83 |
| 3 | 14 | −76.37 |
| 4 | 17 | 18.09 |
| 5 | 26 | −19.60 |
| 6 | 29 | 56.59 |

Numerical Embodiment 3

Unit mm

Surface data

| Surface number i | ri | di | ndi | vdi |
|---|---|---|---|---|
| 1 | 190.498 | 2.01 | 1.83400 | 37.2 |
| 2 | 48.074 | 9.76 | 1.49700 | 81.5 |
| 3 | −275.908 | 0.17 | | |
| 4 | 49.204 | 6.30 | 1.53775 | 74.7 |
| 5 | 929.826 | 0.17 | | |
| 6 | 43.680 | 4.40 | 1.55332 | 71.7 |
| 7 | 127.333 | (Variable) | | |
| 8 | 232.205 | 0.82 | 2.00100 | 29.1 |
| 9 | 12.212 | 5.97 | | |
| 10* | −23.519 | 0.67 | 1.75501 | 51.2 |
| 11* | 43.830 | 0.60 | | |
| 12 | 37.196 | 3.52 | 1.94595 | 18.0 |
| 13 | −32.398 | (Variable) | | |
| 14 | −20.077 | 0.60 | 1.77250 | 49.6 |
| 15 | −278.037 | (Variable) | | |
| 16 (Stop) | ∞ | (Variable) | | |
| 17* | 12.667 | 3.45 | 1.58313 | 59.4 |
| 18* | −366.921 | 0.81 | | |
| 19 | 18.136 | 0.83 | 1.95375 | 32.3 |
| 20 | 11.536 | 0.43 | | |
| 21 | 13.559 | 3.81 | 1.43875 | 94.9 |
| 22 | −34.811 | 0.17 | | |
| 23 | 35.420 | 0.63 | 1.88300 | 40.8 |
| 24 | 9.937 | 3.61 | 1.51742 | 52.4 |
| 25 | −97.438 | (Variable) | | |
| 26 | 45.205 | 1.20 | 1.92286 | 18.9 |
| 27 | −51.299 | 0.60 | 1.95375 | 32.3 |
| 28 | 15.586 | (Variable) | | |
| 29 | 179.006 | 2.98 | 1.51742 | 52.4 |
| 30 | −11.229 | 0.60 | 1.85150 | 40.8 |
| 31 | 77.139 | 0.17 | | |
| 32 | 30.328 | 3.29 | 1.53172 | 48.8 |
| 33 | −17.932 | (Variable) | | |
| 34 | ∞ | 2.00 | 1.51633 | 64.1 |
| 35 | ∞ | 1.00 | | |
| Image plane | ∞ | | | |

Aspherical surface data

Tenth surface

K = −1.42680e+000  A4 = −3.03718e−005  A6 = 1.69961e−008
A8 = −3.62871e−010

Eleventh surface

K = 4.43821e+000  A4 = −4.70125e−005  A6 = 1.11725e−007
A8 = −2.43024e−010

Seventeenth surface

K = −6.79097e−001  A4 = 7.72525e−006  A6 = 6.08844e−008
A8 = 4.12175e−010

Eighteenth surface

K = −7.48650e+002  A4 = 4.91668e−005  A6 = −5.77852e−008
A8 = −1.55308e−011

Various data
Zoom ratio 19.50

| | Wide angle | Intermediate | Telephoto |
|---|---|---|---|
| Focal length | 10.78 | 53.60 | 210.20 |
| F-number | 4.12 | 4.63 | 4.84 |
| Half angle of view | 35.6 | 7.62 | 1.96 |
| Image height | 7.41 | 7.41 | 7.41 |
| Total lens length | 139.33 | 139.33 | 139.33 |
| BF | 12.91 | 12.91 | 12.91 |
| d7 | 0.93 | 25.46 | 35.97 |
| d13 | 9.31 | 9.29 | 8.57 |
| d15 | 36.57 | 12.07 | 2.27 |
| d16 | 1.20 | 1.20 | 1.20 |
| d25 | 1.39 | 15.45 | 13.21 |
| d28 | 19.47 | 5.41 | 7.65 |
| d33 | 10.59 | 10.59 | 10.59 |

Zoom lens unit data

| Unit | First surface | Focal length |
|---|---|---|
| 1 | 1 | 55.38 |
| 2 | 8 | −17.45 |
| 3 | 14 | −28.04 |
| 4 | 17 | 18.06 |
| 5 | 26 | −24.86 |
| 6 | 29 | 89.78 |

Numerical Embodiment 4

Unit mm

Surface data

| Surface number i | ri | di | ndi | vdi |
|---|---|---|---|---|
| 1 | 127.848 | 1.60 | 1.91650 | 31.6 |
| 2 | 44.188 | 6.28 | 1.43875 | 94.9 |
| 3 | −398.741 | 0.17 | | |
| 4 | 54.825 | 3.29 | 1.43875 | 94.9 |
| 5 | 225.850 | 0.17 | | |
| 6 | 46.091 | 3.91 | 1.76385 | 48.5 |
| 7 | 339.544 | (Variable) | | |
| 8 | −440.844 | 0.82 | 1.83481 | 42.7 |
| 9 | 11.543 | 4.17 | | |
| 10* | 1425.898 | 0.62 | 1.58313 | 59.5 |
| 11* | 41.873 | 3.41 | | |
| 12 | −14.168 | 0.62 | 1.43700 | 95.1 |
| 13 | −165.224 | 0.17 | | |
| 14 | 104.120 | 1.82 | 1.92286 | 18.9 |
| 15 | −56.837 | (Variable) | | |
| 16 (Stop) | ∞ | (Variable) | | |
| 17* | 16.025 | 4.18 | 1.58313 | 59.4 |
| 18* | −93.303 | 3.01 | | |
| 19 | 91.910 | 0.61 | 1.83400 | 37.2 |
| 20 | 17.277 | 1.16 | | |
| 21 | 35.972 | 2.60 | 1.43700 | 95.1 |
| 22 | −42.626 | 0.50 | | |
| 23 | 20.001 | 0.60 | 1.95375 | 32.3 |
| 24 | 13.670 | 3.94 | 1.53775 | 74.7 |
| 25 | −69.764 | (Variable) | | |
| 26 | −56.658 | 1.19 | 2.00069 | 25.5 |
| 27 | −22.673 | 0.83 | 1.69680 | 55.5 |
| 28 | 21.417 | (Variable) | | |
| 29 | 179.722 | 4.21 | 1.49700 | 81.5 |
| 30 | −18.637 | 0.76 | 2.00069 | 25.5 |
| 31 | −36.055 | 0.17 | | |
| 32 | 28.209 | 4.39 | 1.53775 | 74.7 |
| 33 | −51.301 | (Variable) | | |
| 34 | ∞ | 2.00 | 1.51633 | 64.1 |
| 35 | ∞ | 1.00 | | |
| Image plane | ∞ | | | |

Aspherical surface data

Tenth surface

K = 2.54189e+004  A4 = 8.39651e−005  A6 = −2.31743e−006
A8 = 1.32338e−008

-continued

Unit mm

Eleventh surface

K = 1.08019e+001   A4 = 2.59711e−005   A6 = −2.56179e−006
A8 = 1.40038e−008

Seventeenth surface

K = −2.67657e−001   A4 = −1.11197e−005   A6 = −1.56889e−008
A8 = −4.86597e−011

Eighteenth surface

K = −5.34856e+001   A4 = 7.30667e−006   A6 = −9.86003e−009
A8 = 1.16698e−012

Various data
Zoom ratio 14.55

| | Wide angle | Intermediate | Telephoto |
|---|---|---|---|
| Focal length | 8.76 | 51.43 | 127.38 |
| F-number | 2.88 | 3.74 | 4.63 |
| Half angle of view | 40.4 | 8.02 | 3.26 |
| Image height | 6.45 | 7.41 | 7.41 |
| Total lens length | 139.21 | 139.21 | 139.21 |
| BF | 14.02 | 14.02 | 14.02 |
| d7 | 1.00 | 24.38 | 34.39 |
| d15 | 35.19 | 11.82 | 1.80 |
| d16 | 13.55 | 0.70 | 0.70 |
| d25 | 2.34 | 15.01 | 14.68 |
| d28 | 17.91 | 18.09 | 18.42 |
| d33 | 11.70 | 11.70 | 11.70 |

Zoom lens unit data

| Unit | First surface | Focal length |
|---|---|---|
| 1 | 1 | 55.39 |
| 2 | 8 | −10.72 |
| 3 | 17 | 21.92 |
| 4 | 26 | −26.98 |
| 5 | 29 | 30.65 |

Relationships between the above-mentioned respective conditional expressions and various numerical values in Numerical Embodiments are shown in Table 1.

TABLE 1

| Conditional Expressions | Numerical Embodiments | | | |
|---|---|---|---|---|
| | 1 | 2 | 3 | 4 |
| (1) | 0.600 | 0.900 | 0.979 | 0.385 |
| (2) | 19.500 | 19.499 | 19.496 | 14.550 |
| (3) | 0.467 | 0.574 | 0.449 | 0.586 |
| (4) | 0.260 | 0.219 | 0.167 | 0.262 |
| (5) | 2.379 | 2.507 | 1.537 | 2.166 |

As described above, according to each of Embodiments, the zoom lens having a small F-number (bright) and good optical performance while suppressing the size of the entire optical system can be realized.

Next, a video camera using the zoom lens of the present invention as a photographing optical system according to an embodiment of the present invention is described with reference to FIG. 17.

Figure 1:
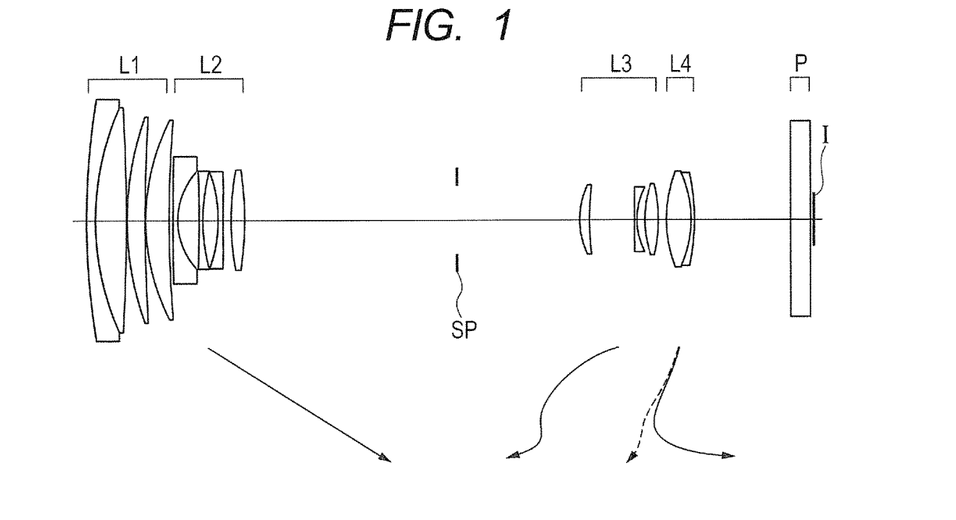
FIG. 1 is a lens cross-sectional view of an optical system according to Embodiment 1 (Numerical Embodiment 1) of the present invention.
Figure 2:
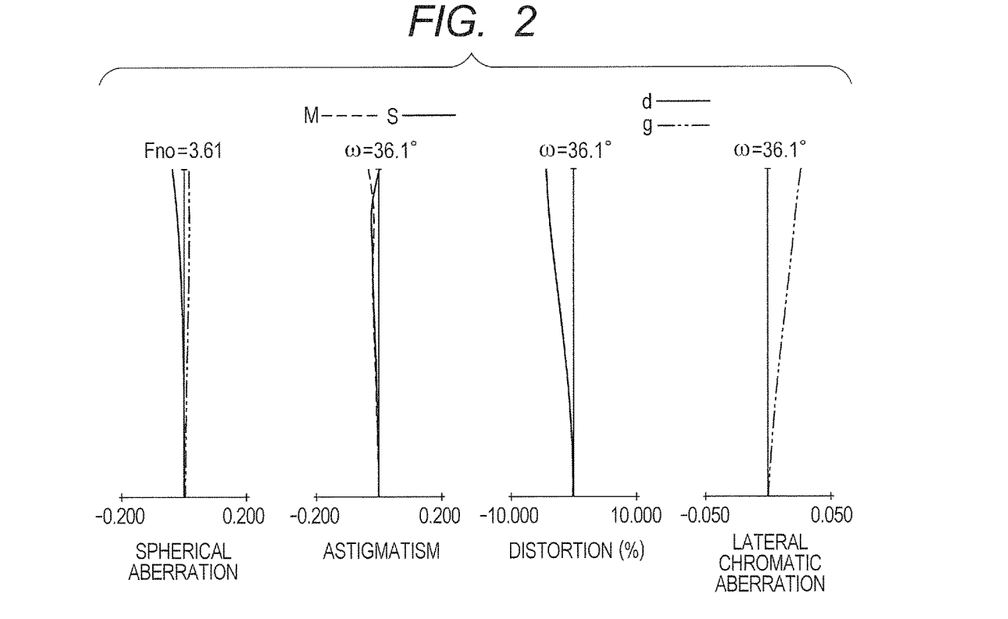
FIG. 2 is aberration diagrams of the optical system according to Numerical Embodiment 1 at a wide angle end.
Figure 3:
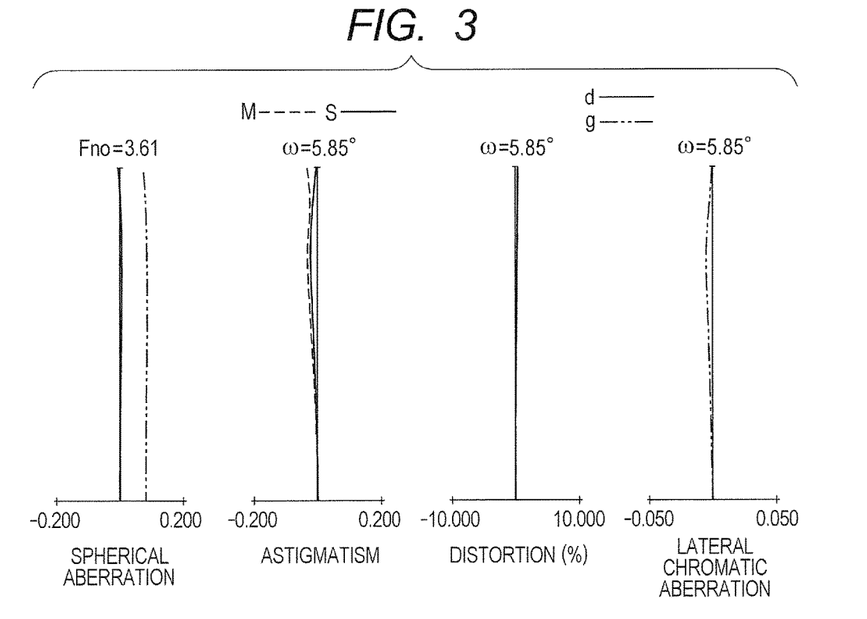
FIG. 3 is aberration diagrams of the optical system according to Numerical Embodiment 1 at an intermediate focal length.
Figure 4:
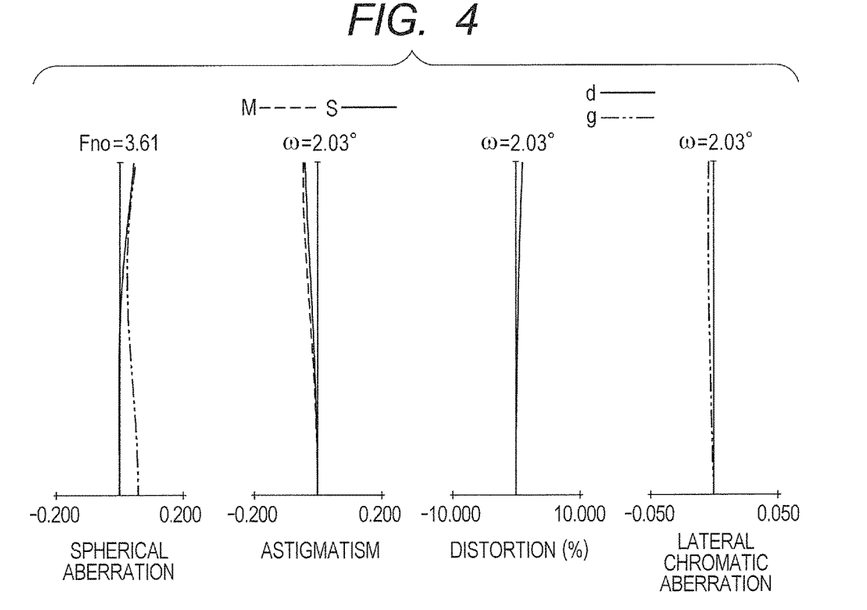
FIG. 4 is aberration diagrams of the optical system according to Numerical Embodiment 1 at a telephoto end.
Figure 5:
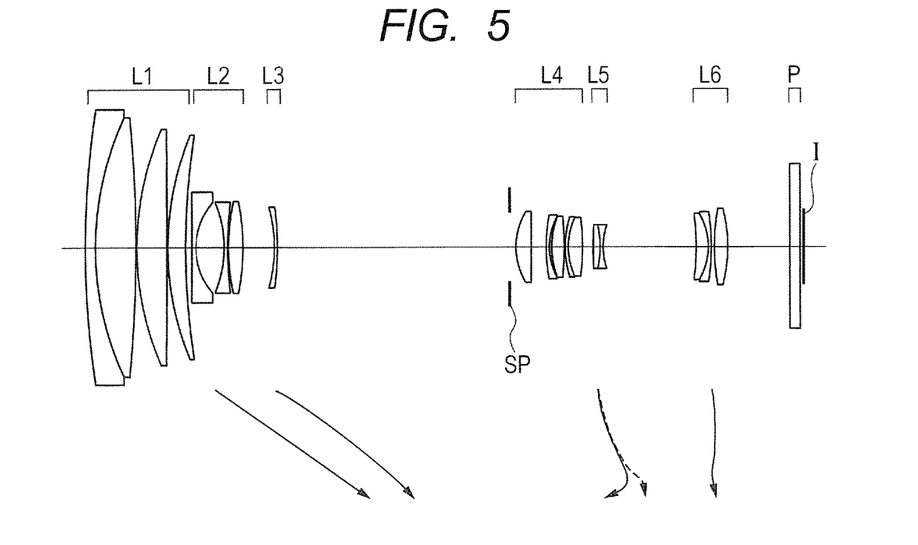
FIG. 5 is a lens cross-sectional view of an optical system according to Embodiment 2 (Numerical Embodiment 2) of the present invention.
Figure 6:
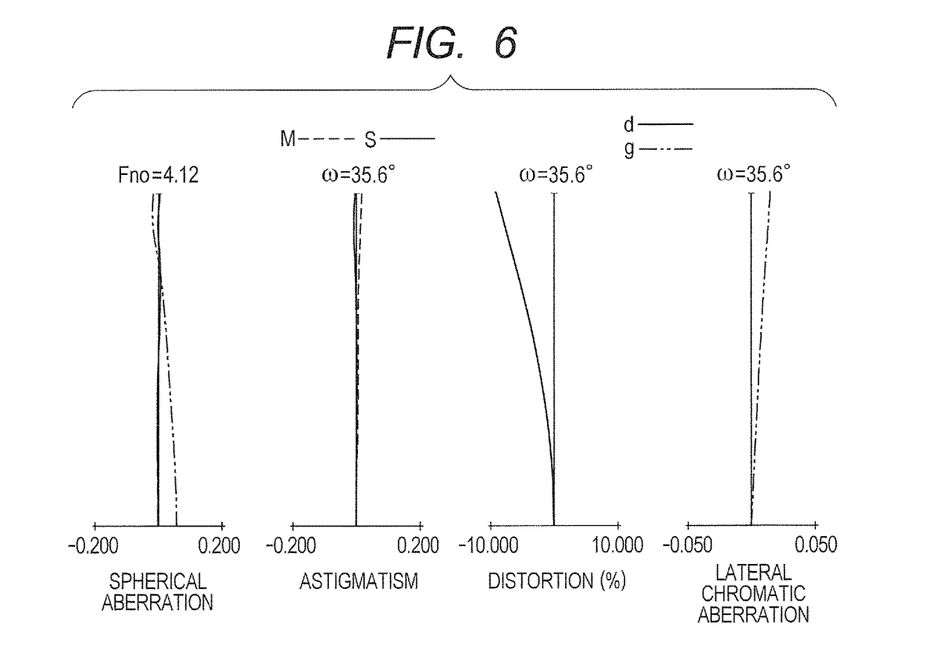
FIG. 6 is aberration diagrams of the optical system according to Numerical Embodiment 2 at a wide angle end.
Figure 7:
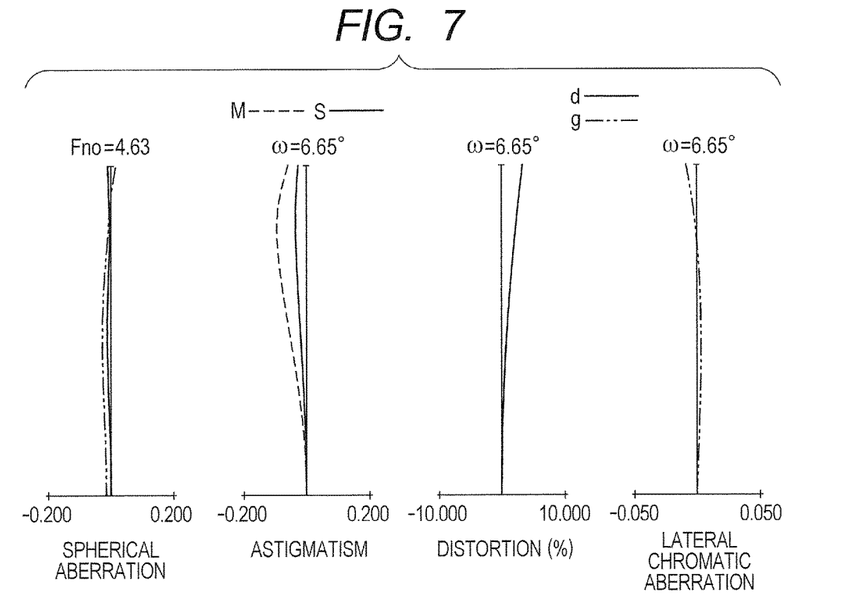
FIG. 7 is aberration diagrams of the optical system according to Numerical Embodiment 2 at an intermediate focal length.
Figure 8:
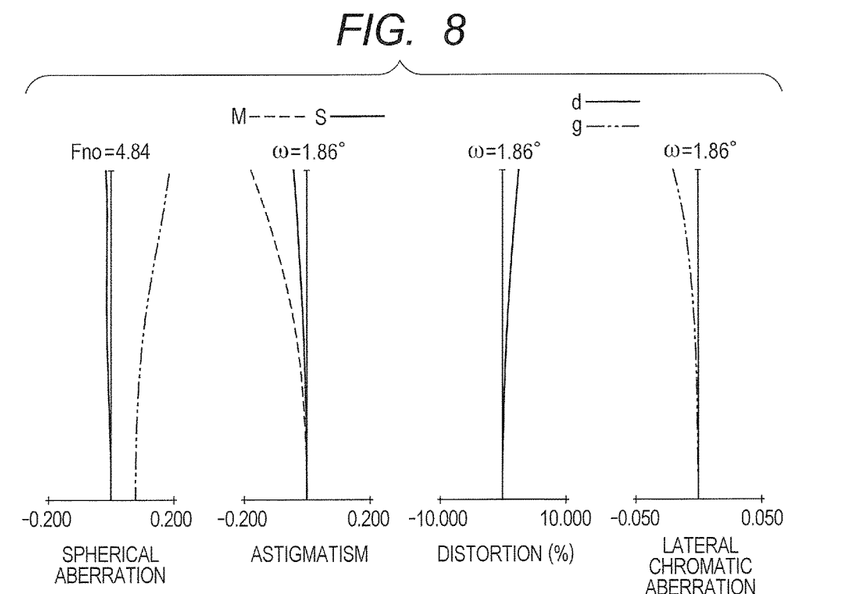
FIG. 8 is aberration diagrams of the optical system according to Numerical Embodiment 2 at a telephoto end.
Figure 9:
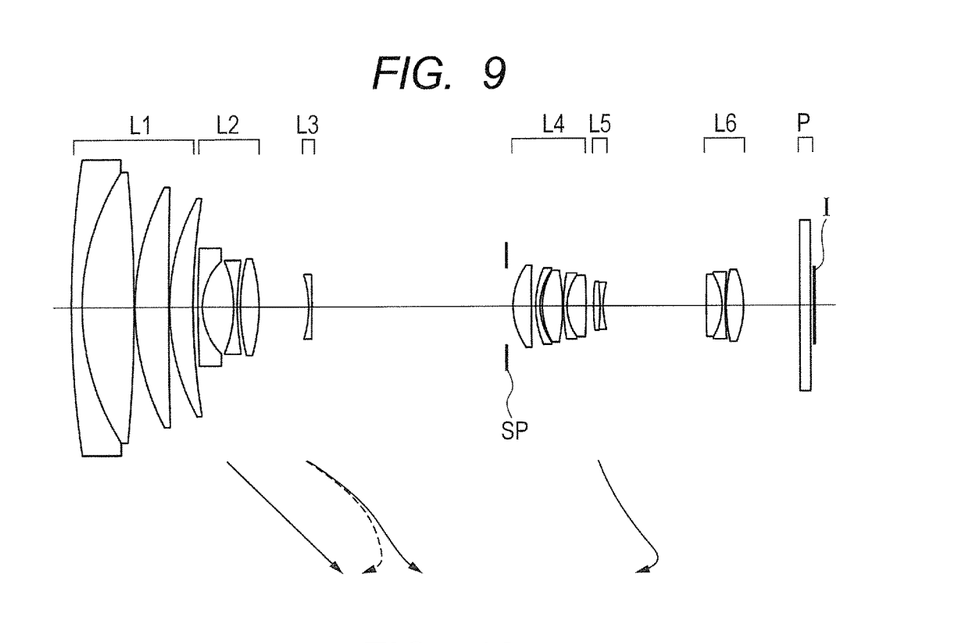
FIG. 9 is a lens cross-sectional view of an optical system according to Embodiment 3 (Numerical Embodiment 3) of the present invention.
Figure 10:
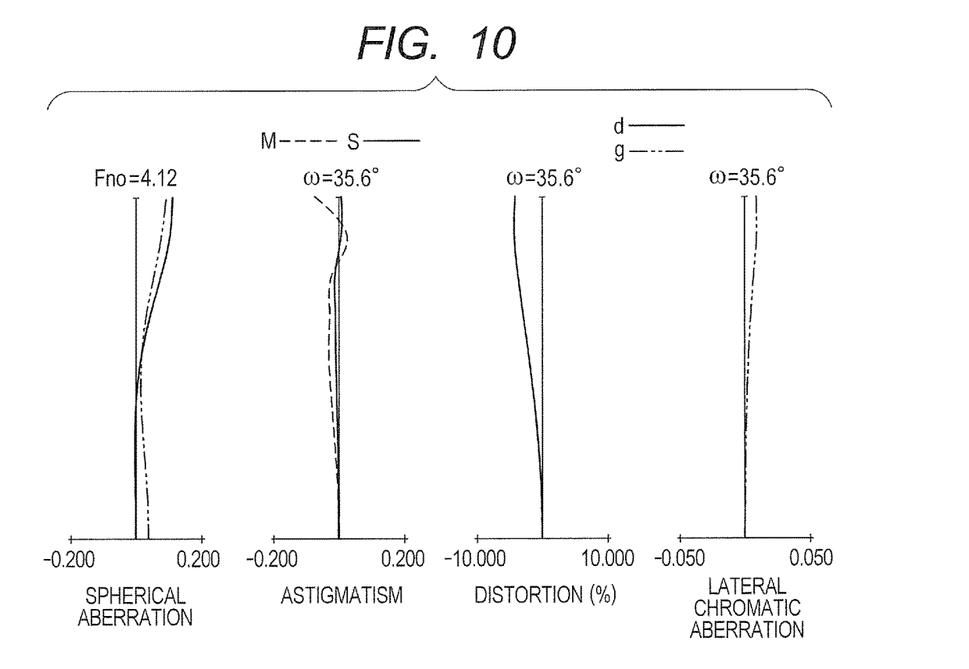
FIG. 10 is aberration diagrams of the optical system according to Numerical Embodiment 3 at a wide angle end.
Figure 11:
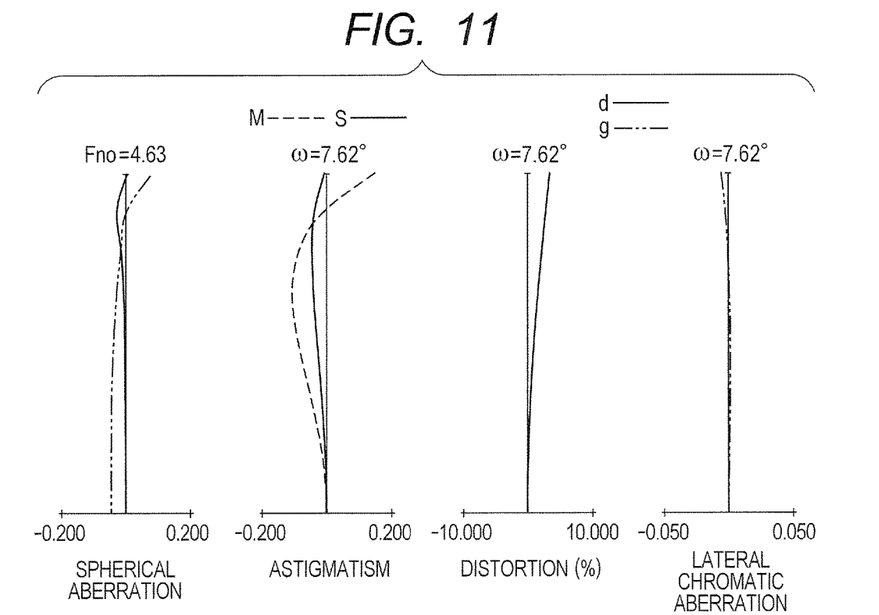
FIG. 11 is aberration diagrams of the optical system according to Numerical Embodiment 3 at an intermediate focal length.
Figure 12:
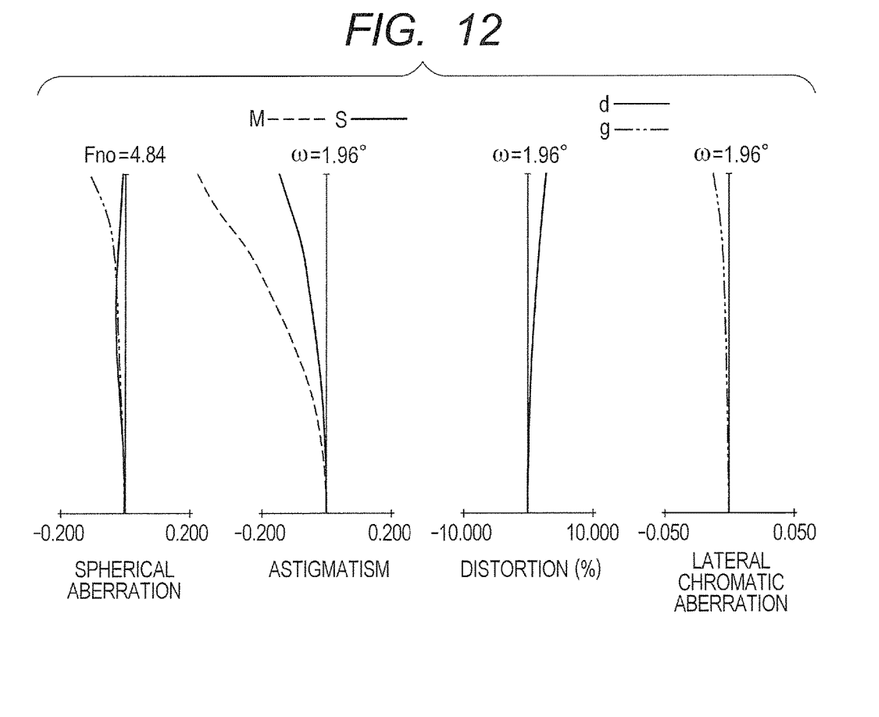
FIG. 12 is aberration diagrams of the optical system according to Numerical Embodiment 3 at a telephoto end.
Figure 13:
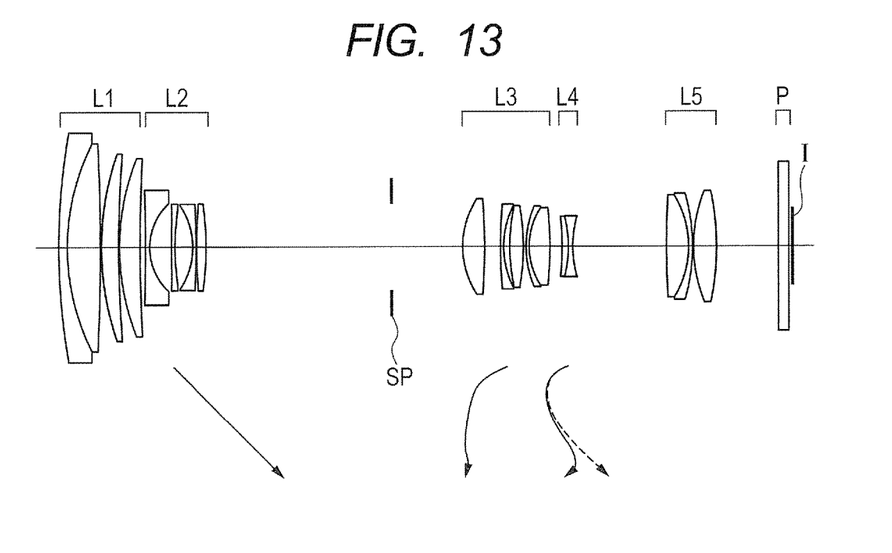
FIG. 13 is a lens cross-sectional view of an optical system according to Embodiment 4 (Numerical Embodiment 4) of the present invention.
Figure 14:
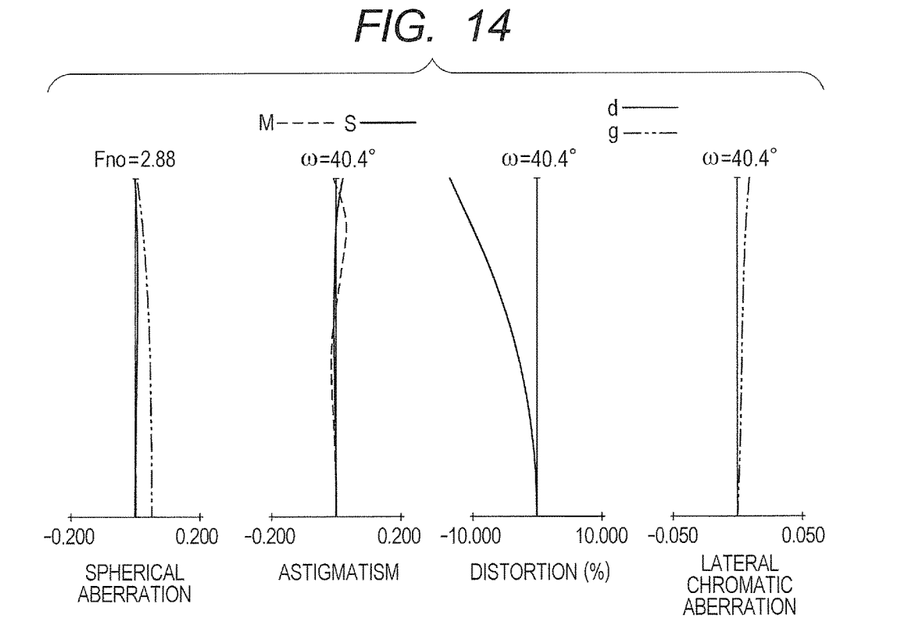
FIG. 14 is aberration diagrams of the optical system according to Numerical Embodiment 4 at a wide angle end.
Figure 15:
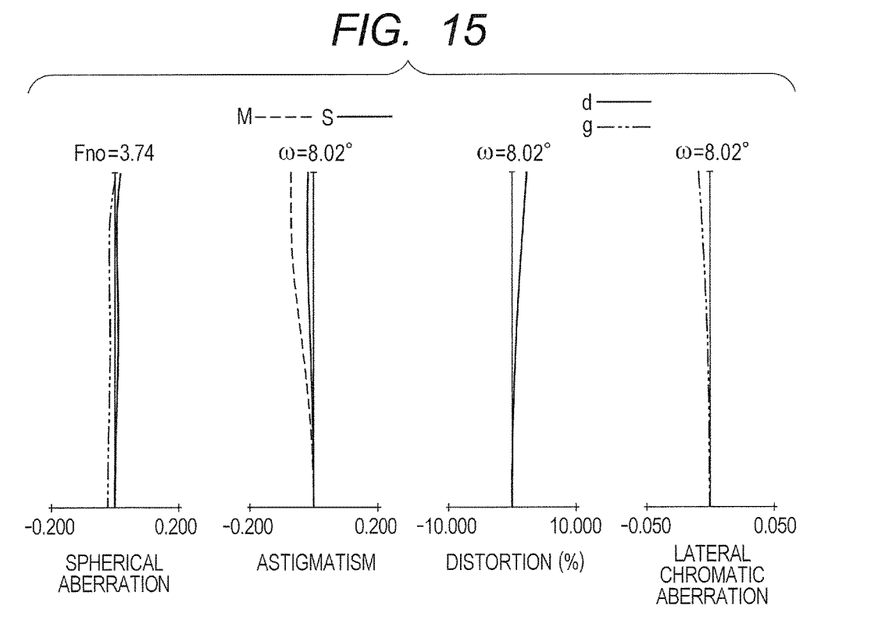
FIG. 15 is aberration diagrams of the optical system according to Numerical Embodiment 4 at an intermediate focal length.
Figure 16:
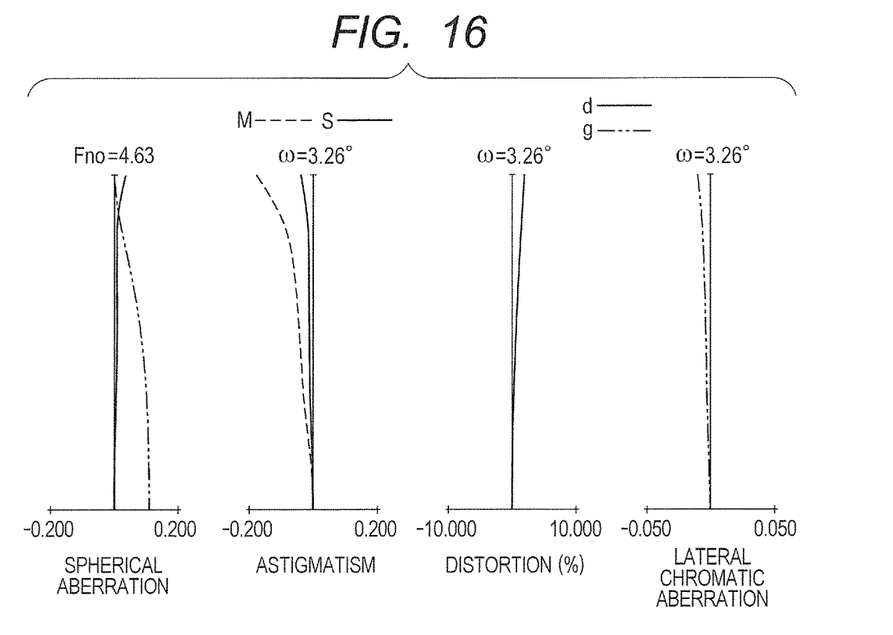
FIG. 16 is aberration diagrams of the optical system according to Numerical Embodiment 4 at a telephoto end.
Figure 17:
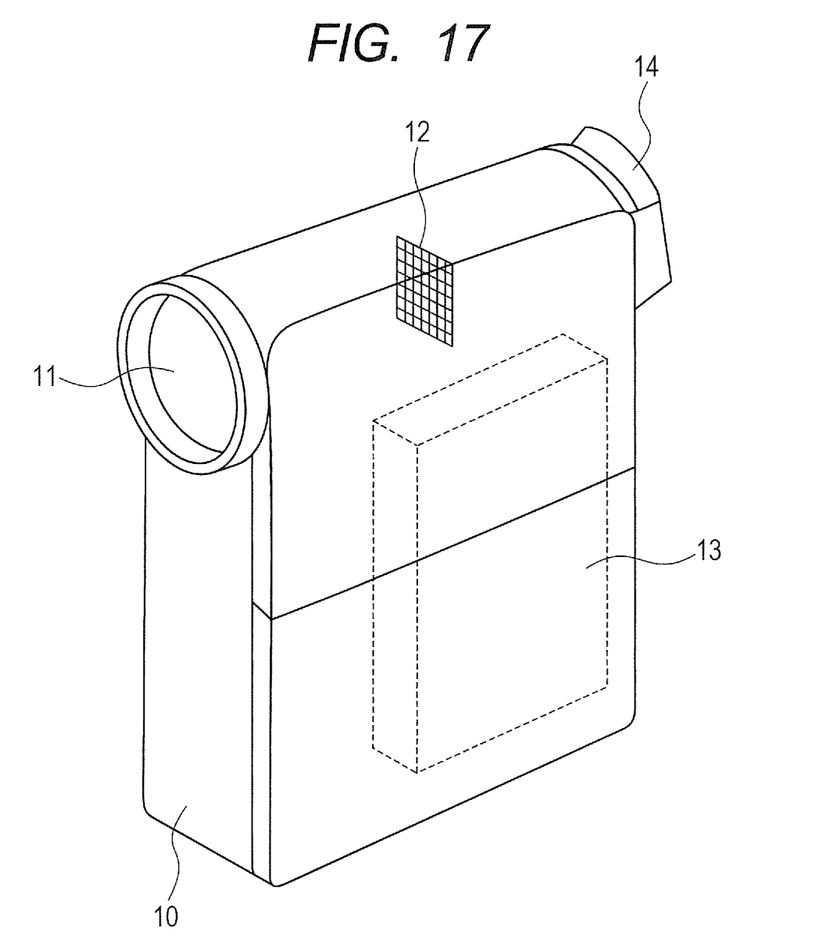
FIG. 17 is a view for illustrating an image pickup apparatus according to an embodiment of the present invention.

In FIG. 17, the video camera includes a video camera main body 10, a photographing optical system 11 including the zoom lens of the present invention, an image pickup element 12 such as a CCD configured to receive light of an object image by the photographing optical system 11, a recording unit 13 configured to record the object image received by the image pickup element 12, and a finder 14 that is used for observing the object image displayed on a display element (not shown). The display element includes a liquid crystal panel and the like, and the object image formed on the image pickup element 12 is displayed on the display element.

Through application of an image pickup apparatus of the present invention to an optical apparatus such as the video camera in such a manner, a small optical apparatus having high optical performance can be realized.

When an electronic image pickup element such as a CCD is used as the image pickup element, aberration is electronically corrected, to thereby enable the image quality of output images to be more enhanced.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-156316, filed Aug. 9, 2016, which is hereby incorporated by reference herein in its entirety.

What is claimed is:

1. A zoom lens, comprising, in order from an object side to an image side:
   a first lens unit having a positive refractive power;
   a second lens unit having a negative refractive power;
   a third lens unit having one of a positive refractive power and a negative refractive power; and
   a rear lens group including at least one lens unit,
   wherein the first lens unit is not moved for zooming, and intervals between adjacent lens units are changed during zooming,
   wherein the first lens unit includes at least three lenses, and the second lens unit includes at least three lenses,
   wherein at least two lens surfaces, among lens surfaces of lenses included in the second lens unit except for a lens arranged closest to the object side, have aspherical shapes, and
   wherein the following conditional expressions are satisfied:

$$0.38 < |m3/m2|; \text{ and}$$

$$9.00 < ft/fw,$$

where fw represents a focal length of the zoom lens at a wide angle end, ft represents a focal length of the zoom lens at a telephoto end, m2 represents a movement amount of the second lens unit during zooming from the wide angle end to the telephoto end, and m3 represents a movement amount of the third lens unit during zooming from the wide angle end to the telephoto end, in which a movement amount has a positive sign when a lens unit is located on the image side at the telephoto end as compared to the wide angle end.

2. The zoom lens according to claim 1, wherein the following conditional expression is satisfied:

$$0.40 < |m3/f3| < 0.65,$$

where f3 represents a focal length of the third lens unit.

3. The zoom lens according to claim 1, wherein the following conditional expression is satisfied:

$$0.1 < m2/ft < 0.3,$$

where ft represents the focal length of the zoom lens at the telephoto end.

4. The zoom lens according to claim 1, wherein the following conditional expression is satisfied:

$$1.3 < m2/D1 < 3.0,$$

where D1 represents a thickness of the first lens unit on an optical axis.

5. The zoom lens according to claim 1, wherein the third lens unit includes a negative lens.

6. The zoom lens according to claim 1, further comprising an aperture stop on the image side of a lens that is arranged fourth when counted from a lens arranged adjacent to the first lens unit on the image side.

7. An image pickup apparatus, comprising:
   a zoom lens, comprising, in order from an object side to an image side:
      a first lens unit having a positive refractive power;
      a second lens unit having a negative refractive power;
      a third lens unit having one of a positive refractive power and a negative refractive power; and
      a rear lens group including at least one lens unit,
   wherein the first lens unit is not moved for zooming, and intervals between adjacent lens units are changed during zooming,
   wherein the first lens unit includes at least three lenses, and the second lens unit includes at least three lenses,
   wherein at least two lens surfaces, among lens surfaces of lenses included in the second lens unit except for a lens arranged closest to the object side, have aspherical shapes, and
   wherein the following conditional expressions are satisfied:

$$0.38 < |m3/m2|; \text{ and}$$

$$9.00 < ft/fw,$$

where fw represents a focal length of the zoom lens at a wide angle end, ft represents a focal length of the zoom lens at a telephoto end, m2 represents a movement amount of the second lens unit during zooming from the wide angle end to the telephoto end, and m3 represents a movement amount of the third lens unit during zooming from the wide angle end to the telephoto end, in which a movement amount has a positive sign when a lens unit is located on the image side at the telephoto end as compared to the wide angle end; and
   an image pickup element which receives light of an image formed by the zoom lens.

* * * * *